Dec. 20, 1955 H. J. FRALISH ET AL 2,727,297
METHOD OF MAKING WOUND CONDENSERS
Filed Feb. 8, 1950 3 Sheets-Sheet 1

INVENTORS
H. J. FRALISH
G. P. MC GRAW JR.
BY [signature]
ATTORNEY

Dec. 20, 1955 H. J. FRALISH ET AL 2,727,297

METHOD OF MAKING WOUND CONDENSERS

Filed Feb. 8, 1950 3 Sheets-Sheet 2

INVENTORS
H. J. FRALISH
G. P. McGRAW JR.
BY E. A. Kane
ATTORNEY

METHOD OF MAKING WOUND CONDENSERS

Filed Feb. 8, 1950 3 Sheets-Sheet 3

INVENTORS
H. J. FRALISH
G. P. McGRAW JR.
BY
E. F. Kane
ATTORNEY

United States Patent Office 2,727,297

Patented Dec. 20, 1955

2,727,297

METHOD OF MAKING WOUND CONDENSERS

Howard J. Fralish, La Grange Park, and George P. McGraw, Jr., Downers Grove, Ill., assignors to Western Electric Company, Incorporated, New York, N. Y.

Application February 8, 1950, Serial No. 143,126

2 Claims. (Cl. 29—25.42)

This invention relates to condenser fabrication and more particularly to methods of making wound condensers.

It is an object of the present invention to provide effective and efficient methods of making wound condensers.

The present invention contemplates making a plurality of condensers by applying vaporized metal in a plurality of areas to one side of elongated moving sheets of dielectric to form composite sheets of metallized dielectric having a plurality of parallel relatively wide bands of conducting material thereon separated from each other by relatively narrow uncoated or bare stripes and superposing one of the composite sheets on another with the bands of metal parallel to each other and with portions of the bands of metal of one composite sheet overlapping the bare stripes and portions of the bands of metal of the other composite sheet, winding predetermined lengths of the composite sheets longitudinally into a roll, cutting the roll at predetermined points thereon into condenser sections in which an edge portion of alternate ones of the pair of bands of conducting material therein extends to opposite ends of the condenser, and spraying molten metal across the ends of each condenser to form terminals thereon, alternate ones of which terminals are bonded and electrically connected to the edge portions of alternate ones of the conducting bands.

In one embodiment of the invention, on one side of one of a pair of dielectric sheets, there is applied a plurality of relatively wide conducting bands of metal overlay having a width twice the width of the band of conducting material in the completed condenser, the conducting bands being spaced apart from each other and from the longitudinal edges of the sheet of dielectric by relatively narrow bare stripes. Intermediate the longitudinal marginal portions of one side of the other dielectric sheet there is applied a plurality of said wide conducting bands of metal overlay and a pair of marginal bands of metal overlay approximately one-half the width of the wide bands extending along the longitudinal edges of the sheet, all of the bands being spaced from the next adjacent bands by a relatively narrow bare stripe. One of the composite sheets thus formed is then superposed upon the other with the longitudinal edges of the sheets in alignment, in which position the bare stripes of one composite sheet are in alignment with the median portion of the wide conducting bands of the other composite sheet and the wide conducting bands in one composite sheet are in overlapping relation with portions of a pair of conducting bands in the other composite sheet. The composite sheets are then wound into a roll and cut into sections of equal length along planes passing through the median lines of the bare stripes of each of the composite sheets and through the conducting bands aligned with each bare stripe. The condenser sections are then radially compressed into flat condensers and molten metal is applied to each end of the condensers to form terminals thereon, alternate ones of which are bonded and electrically connected to the edge portions of alternate bands of conducting material in the condenser.

In another embodiment, bands of conducting material of slightly greater width than the width of the band of conducting material in the completed condenser are applied to one side of elongated sheets of dielectric in parallel relation longitudinally of the sheets, the bands being separated from each other and from one edge of the dielectric sheet by uncoated or bare stripes of relatively narrow width. One of these composite sheets thus formed is turned in a plane end for end and superposed on another with the conducting bands of each in parallel relation to each other and with portions of each of the conducting bands of one composite sheet in overlapping relation to a portion of a conducting band and with a portion of a bare stripe on the other composite sheet, and with portions of the bare stripes of one web in overlapping relation to portions of the bare stripes and portions of the conducting bands on the other sheet. The pair of superposed composite sheets are wound longitudinally into a roll and cut into condenser sections along planes passing through the bare stripes of each of the composite sheets and through the conducting bands aligned with the bare stripes to form condenser sections each comprising a pair of dielectric ribbons coated with metal overlay on one side except for a relatively narrow bare marginal stripe disposed on alternate dielectric ribbons at opposite ends of the condenser. Terminals are applied to opposite ends of the condenser sections electrically connecting edge portions of alternate bands of metal overlay in the condensers.

In still another embodiment, one of a pair of composite sheets comprising relatively wide bands of conducting material separated from each other on one side of sheets of dielectric by relatively narrow uncoated stripes is superposed on the other with the conducting bands in parallel relation and with the conducting bands of one sheet in overlapping relation with portions of two adjacent bands and with an uncoated stripe on the opposite sheet and with the uncoated stripes of one sheet disposed opposite a conducting band on the other sheet and closer to one longitudinal edge of the band than the other edge thereof. The composite sheets are then wound into a roll and cut into condenser sections along planes passing through the conducting bands of each sheet and adjacent one edge thereof to provide condenser sections each having a pair of dielectric ribbons coated on one side of each with conducting material except for a narrow bare stripe disposed on alternate ribbons adjacent opposite longitudinal edges thereof and forming a wide and a narrow band of conducting material on each dielectric ribbon. Molten metal is then sprayed onto the ends of the condenser sections to form terminals each electrically connected to the edge portions of one narrow and one wide band of conducting material on alternate dielectric ribbons in the condenser.

Other objects and advantages of the invention will be apparent by reference to the following detailed description thereof and the accompanying drawings illustrating a preferred embodiment thereof in which Fig. 1 is a diagrammatic view of the apparatus for applying a plurality of separated metal overlays to a sheet of dielectric;

Figure 2:
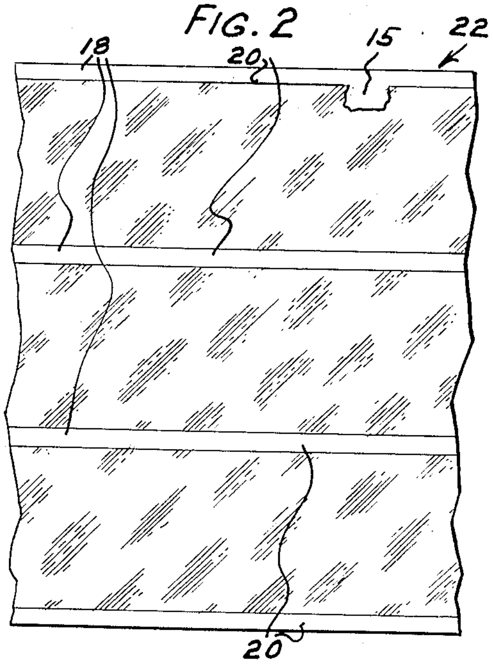
Figs. 2 and 3 are face views of portions of composite sheets showing two different patterns of metal overlay on sheets of dielectric.
Figure 3:
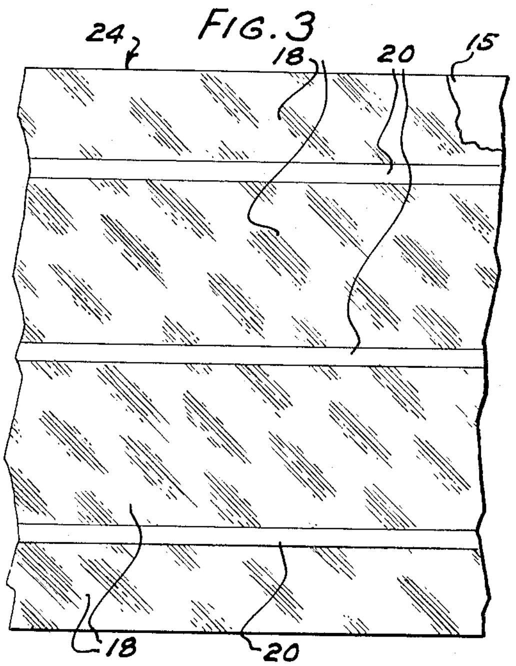

In practicing a preferred embodiment of the present invention, two elongated sheets or webs of dielectric 15—15 (Figs. 2 and 3) are provided, on one side of each of which is applied a plurality of bands or coatings 18 of conducting material extending longitudinally of the sheets in parallel relation to each other. The bands 18 of conducting material are separated from each other by uncoated portions forming relatively narrow bare stripes 20 of uniform width spaced apart a predetermined distance from each other to define therebetween the relatively wide bands 18 of uniform width. The bands 18 on one of the sheets 15 are displaced laterally thereon with respect to the arrangement of bands 18 on the other sheet 15 a distance approximately one-half the width of the band. Each of the composite sheets 22 and 24 thus formed has on one face thereof a plurality of continuous longitudinally extending alternately disposed coated and uncoated zones, and in the composite sheet 22 the arrangement of coated zones is such as to provide three relatively wide bands 18 separated from each other and the edges of the sheet by bare stripes 20, and in the composite sheet 24 the arrangement of coated and uncoated zones is such as to provide two relatively wide bands 18 in the central portion of the sheet 15 and two marginal bands of a width substantially one-half the width of the wide bands 18.

The dielectric sheets may be made of paper or any suitable plastic material, such as cellulose acetate, and the bands 18 may be of any suitable electrically conducting material. Preferably, the composite sheets 22 and 24 are metallized paper, the sheet of dielectric being a thin paper, to one side of which a lacquer is applied to provide a smooth surface thereon for receiving the bands 18 of metallic overlay applied thereto in the form of metallic vapor.

Figure 1:
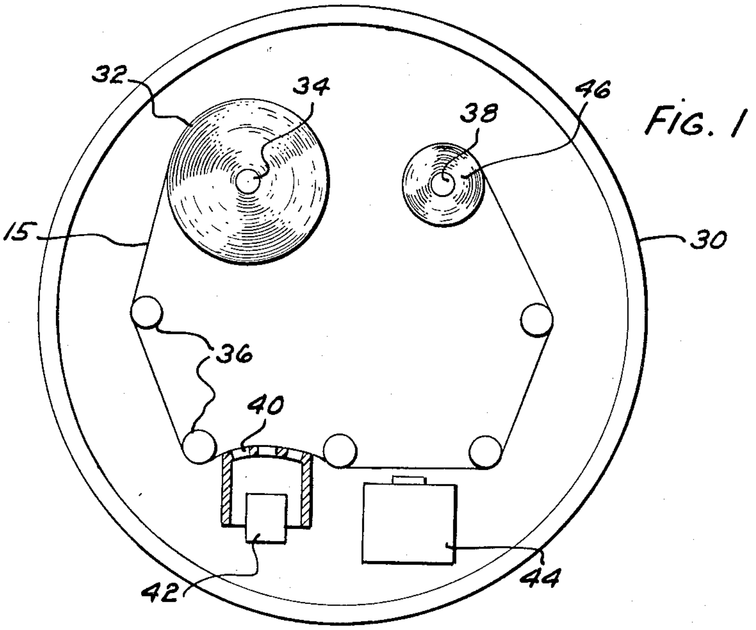

The apparatus for applying the bands of metallic overlay 18 to the sheets of dielectric is shown diagrammatically in Fig. 1 and comprises generally a cylindrical housing 30 forming a vacuum chamber in which the sheets are coated with metal. A supply roll 32 of the paper dielectric is rotatably mounted on a supporting shaft 34 and the sheet 15 from the roll is guided around a plurality of guide rollers 36 and has its leading end secured to a winding mandrel 38, which serves to advance the sheet and on which the sheet is wound after the metallic overlays have been applied thereto. The sheet of dielectric 15 passes over the convex upper apertured surface of a grid or shield 40, below which is mounted a vaporizing unit 42 for vaporizing a small amount of silver, molybdenum or other suitable metal. An almost imperceptible amount of the metal vapor passes through the openings in the grid 40 and is deposited on the moving sheet 15 in a predetermined pattern controlled by the apertures in the grid 40. The sheet 15 next passes over a vaporizer 44, adapted to vaporize zinc, cadmium or other suitable metal, the vapor from which has an affinity for the silver or other metal deposited on the sheet and is deposited only on the coated portions of the sheet to form continuous stripes of metallic overlay on the sheet 15. The composite sheet 22 thus formed is wound into a roll 46 on the mandrel 38 and, when the operation has been completed, the roll 46 of composite sheet of one pattern may be removed from the apparatus. By substituting another grid having the proper aperture pattern, the composite sheet 24 may be formed in a similar manner in the same apparatus.

Portions of the composite sheets 22 and 24 are arranged in superposed relation to each other (Fig. 4) with the uncoated face of the upper sheet in engagement with the metallic bands 18 of the lower sheet and with the longitudinal edges of the sheets in alignment with each other. With the sheets 22 and 24 in this position, the pattern thereof is such as to arrange the bare stripes 20 in equally spaced and staggered relation to each other and to position each wide band 18 in overlapping relation with portions of two other bands and a bare stripe.

Figures 4, 5:
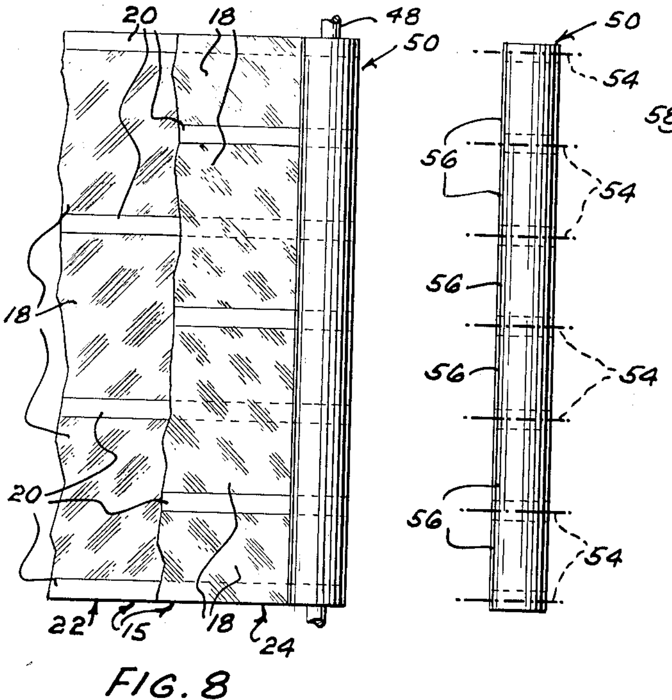
Fig. 4 is a fragmentary view of the two composite sheets shown in Figs. 2 and 3 in superposed relation with a portion thereof wound into a roll.
Fig. 5 is a view of the completed roll with broken lines indicating the planes through which the roll is cut into sections from which the individual condensers are made.
Figure 9:
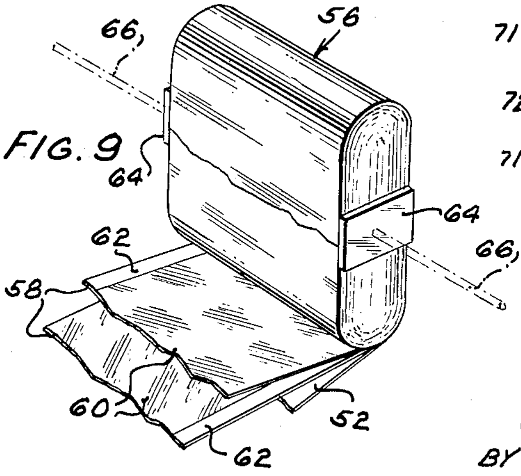
Fig. 9 is an enlarged perspective view of the completed condenser with a portion of the dielectric ribbons thereof displaced to show the arrangement of the bands of metal overlay and the bare stripes thereon.

A predetermined length of the composite sheets is then wound on a mandrel 48 into a roll or stick 50, as indicated in Figs. 4 and 5. The roll is then cut at predetermined points thereon into sections, from which the individual condensers are formed. The cutting may occur during the winding of the roll by rotary slitters or stationary cutting blades engaging the roll as it is being formed or engaging the composite sheets in advance of the roll 50 being wound on the mandrel. Preferably, the roll 50 is cut into condenser sections after the winding operation is completed. Adhesive may be applied to the ends of the composite sheets 22 and 24 to prevent unwinding of the roll or stick 50. If desired, the roll 50 may have a short strip of paper 52 (Fig. 9) or other transparent sheet of dielectric wrapped around the roll and sealed along its overlapping edge to protect the roll and prevent its unwinding. In the preferred way of cutting the roll 50 into condenser sections, the roll is removed from the mandrel 48 and a sharp-edged thin cutting blade is forced transversely through the roll at predetermined spaced points into engagement with a cooperating backing member of relatively soft metal. By cutting the roll 50 into sections along planes indicated by broken lines 54 (Fig. 5) passing through the median portion of the bare stripes 20 in each of the composite sheets and through the bands 18 of metal overlay aligned with the bare stripes 20, a plurality of substantially identical condenser sections 56 are formed.

Each condenser section 56 thus formed comprises a pair of ribbons of dielectric 58—58 (Fig. 9) of predetermined width having on one side of each thereof a relatively wide band 60 of conducting material and a narrow bare marginal stripe 62, the bands 60 having portions thereof in overlapping relation to each other and alternate ones having one marginal edge extending laterally beyond a marginal edge of the other band 60 and exposed in planes at opposite ends of the condenser and having the other edge spaced from each end of the condenser.

Figure 7:
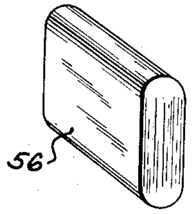
Fig. 7 is a perspective view of one of the condenser sections in compressed condition.
Figure 8:
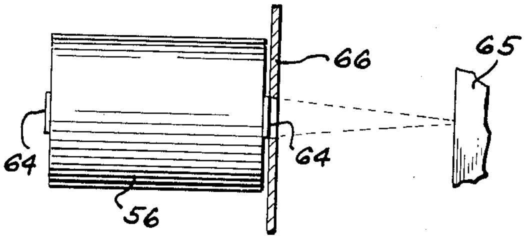
Fig. 8 is a diagrammatic view showing the manner in which molten metal is sprayed onto the ends of the condenser sections to form terminals thereon.

After being cut from the roll, the condenser sections are compressed radially to a flattened condition (Fig. 7) and have molten metal applied to each end thereof to form terminals 64. As disclosed herein, the terminals 64 are formed by spraying molten metal onto the ends of the condenser sections from a spraying apparatus 65 (Fig. 8), through a slot in a plate 66 positioned adjacent the end of the condenser sections. The molten metal, as it is sprayed onto the end portions of the condensers, engages and is bonded to portions of the edges of each convolution of the band of metallic overlay 60 disposed in the end plane of the condenser. Thus alternate ones of the terminals are bonded to and electrically connect portions of successive convolutions of alternate ones of the pair of conducting bands 60 of the condenser. Wire terminal extensions 66, shown in dotted lines in Fig. 9, may be soldered to the terminals 64, if desired. The condensers, after the terminals 64 have been applied thereto, may be impregnated with wax in a vacuum chamber in order to protect it from the deteriorating effect of moisture and to impart a degree of rigidity thereto.

Although a pair of composite sheets 22 and 24 (Fig. 4), having two different patterns or arrangements of conducting bands thereon, disclose one set of cooperating sheets from which a plurality of substantially similar condensers may be made having the same length and capacity values, it will be understood that sets of composite sheets having other patterns or arrangements of conducting bands thereon may be superposed one on another to form other sets of cooperating composite sheets from which condensers may be made having a plurality of different lengths and different capacity values.

Figure 10:
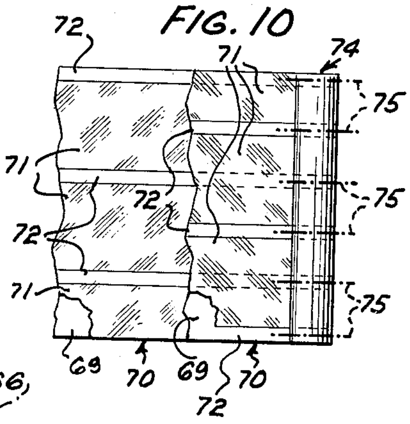
Fig. 10 is a view similar to Fig. 4 showing a pair of composite sheets having another arrangement of metal overlays thereon disposed in superposed relation and partially wound into a roll and indicating, with broken lines, the planes through which the roll is cut to form a plurality of condenser sections.

It is not necessary that the pair of composite sheets from which the plurality of condensers are made have different patterns of metallic overlay, such as that disclosed in the embodiment just described. The patterns of metallic overlay of the composite sheets may be identical, as illustrated in Fig. 10, wherein the sheets of dielectric 69 of the composite sheets 70—70 have a plurality of bands 71 of conducting material on one side thereof separated from each other and one marginal edge of the sheet 69 by relatively narrow bare stripes 72, the bands 71 being relatively wide and of uniform width except one, a narrow band of substantially one-half the width of the wider bands and disposed along one border of the sheet. One of the composite sheets 70 is turned end for end and superposed on the other composite sheet so that the bare stripes 72 in the central portion of each sheet are aligned with the intermediate portion of the bands of conducting material 71 of the other sheet, after which the two composite sheets are wound into a roll 74 to which is applied a protective strip or envelope in a manner similar to that already described in connection with the preferred embodiment. The roll 74 then may be cut into condenser sections along planes indicated by the broken lines 75—75 passing through the median portion of each of the bare stripes 72 in each of the composite sheets and through the bands 71 of conducting material aligned with the bare stripes 72.

Figure 11:
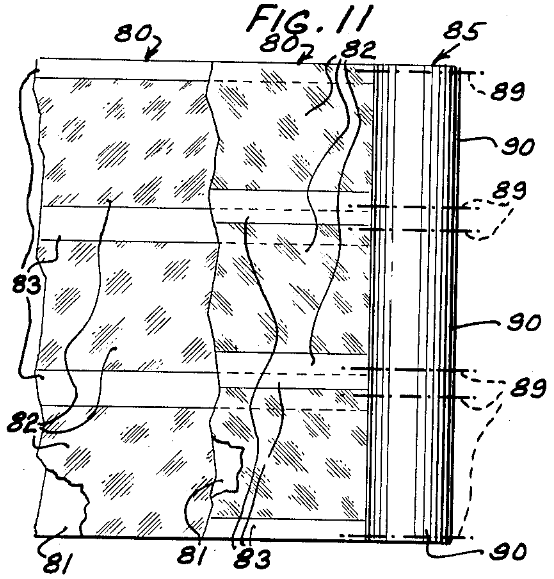
Fig. 11 is a view similar to Figs. 4 and 10 illustrating another embodiment of the invention and showing a pair of composite sheets in superposed relation with portions thereof wound into a roll and indicating in broken lines the planes through which the roll is cut into condenser sections, the composite sheets having another pattern of metal overlays thereon.
Figure 12:
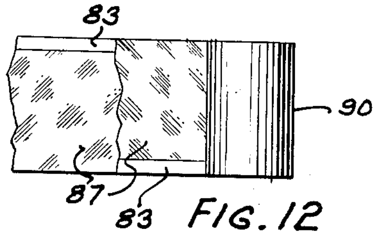
Fig. 12 is a view of one of the condenser sections formed from the roll in Fig. 11 with portions of the pair of composite ribbons thereof unwound.

In the embodiment of the invention shown in Figs. 11 and 12, one of a pair of composite sheets 80—80, each comprising a sheet 81 of dielectric on which are applied a plurality of bands of conducting material 82 separated from each other and from one edge of the sheet 81 by bare margins 83, is superposed on the other, as indicated in Fig. 11, and wound into a roll or stick 85 in a manner similar to that already described in connection with the embodiment shown in Fig. 10. The bands 82 of conducting material, which are of the same width, are slightly wider than the width of the band of conducting material 87 (Fig. 12) in the finished condenser made according to this method. When one of the composite sheets 80 is superposed on the other, as illustrated in Fig. 11, a major portion of each of the bands 82 in one composite sheet is in overlapping relation with the major portion of one of the bands 82 in the other composite sheet and each band has a marginal portion thereof which extends laterally beyond the edge of the band aligned therewith and is in overlapping relation to a portion of a bare stripe. The bare stripes 83 separating the bands 82 in one sheet may be aligned in partial overlapping relation with the stripes 83 in the other composite sheet and with portions of the bands 82 of conducting material thereon. The roll or stick 85, when completely wound, is cut into sections along planes indicated by the broken lines 89—89, which pass through the bare stripes 83 in one composite sheet and through the marginal portion of the bands of conducting material 82 in the other composite sheet to provide condenser sections 90 similar to the condenser sections 56 shown in Figs. 5 and 9. Terminals are applied to the ends of the condenser sections 90, and the condensers are then impregnated with wax in the same manner as described in connection with the embodiment illustrated in Figs. 2 to 9.

Figures 13, 14, 15, 16, 17:
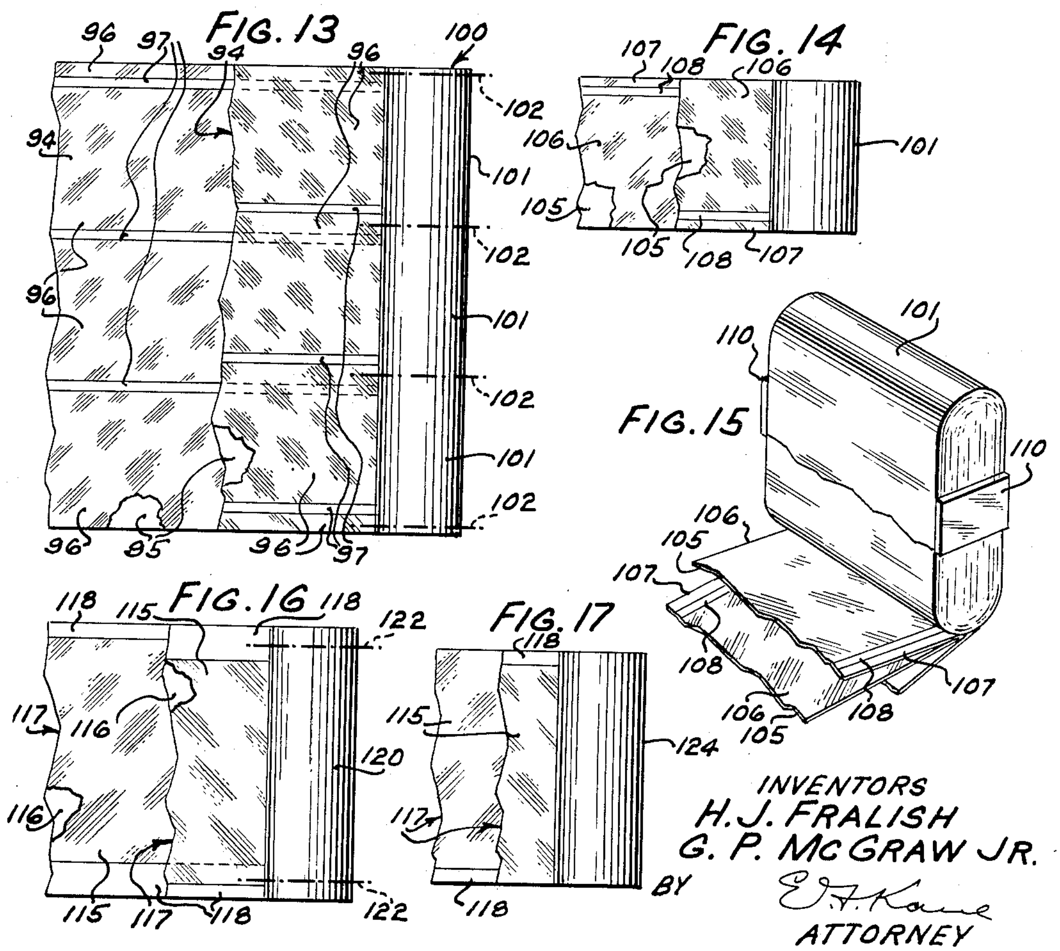
Fig. 13 is a view similar to Fig. 11 illustrating still another embodiment of the invention and showing a pair of composite sheets having yet another pattern of cooperating metallic overlays thereon.
Fig. 14 is a view of one of the condenser sections formed from the roll in Fig. 13 with portions of the pair of composite ribbons thereof unwound.
Fig. 15 is a perspective view of a completed condenser formed from the condenser section shown in Fig. 14 with portions of the pair of composite ribbons unwound to illustrate the pattern of metal overlay thereon.
Fig. 16 is a view of yet another embodiment of the invention showing a pair of composite sheets in overlapping relation with portions thereof wound into a roll.
Fig. 17 is a view of a condenser partly unwound formed from the composite sheets shown in Fig. 16.

In the embodiment disclosed in Figs. 13 to 15, a pair of composite sheets 94, 94 is formed by applying onto one side of each of a pair of dielectric sheets 95, 95 a plurality of bands of metal 96 and separated from each other by relatively narrow bare stripes 97. The bare stripes 97 are disposed on the sheet of dielectric 95 so as to define a plurality of relatively wide conducting bands 96, one of which extends to one marginal edge of the sheet 95 and a relatively narrow conducting band along the other marginal edge thereof. The composite sheets 94, 94, when superposed as indicated in Fig. 13, have the bare stripes 97 on one composite sheet positioned in spaced relation to the bare stripes in the other composite sheet and aligned with the conducting bands 96, the bare stripes 97 in one of the composite sheets being positioned closer to one edge than the other of the conducting bands 96 in the other composite sheet. In the pattern of overlays as shown in Fig. 13, a major portion of each band 96 in each of the composite sheets is in overlapping relation with a major portion of one of the bands in the other composite sheet and a minor portion of each of the bands 96 of each of the composite sheets is in overlapping relation with a portion of another of the bands 96 and with a bare stripe 97 in the other composite sheet. The superposed composite sheets 95 may then be wound into a roll or stick 100, upon completion of which the roll may be cut into a plurality of similar condenser sections 101 along planes indicated by the broken lines 102—102 passing through the bands 96 of metallic overlay in each of the composite sheets. Each condenser section 101 thus formed (Fig. 15) comprises a pair of ribbons of dielectric 105 having a relatively wide band of conducting material 106 and a narrow band of conducting material 107 extending along opposite longitudinal edges of the sheet and separated from each other by a relatively narrow bare stripe 108, the bare stripes 108 in alternate ribbons 105 being positioned adjacent opposite ends of the condenser sections. The bands 106 of conducting material on the ribbons 105 of dielectric have a major portion thereof in overlapping relation to each other, as indicated in Fig. 14, and each band 106 has a marginal portion thereof extending beyond a marginal edge of the other band 106 to the edge of the ribbon 105 and has its edge exposed in the ends of the condenser sections. Like the condenser sections 54 and 90, the condenser sections 101 have terminals 110 applied to each end by spraying molten metal to the ends thereof, as shown in Fig. 15, after which the condenser may be impregnated with wax.

Figure 6:
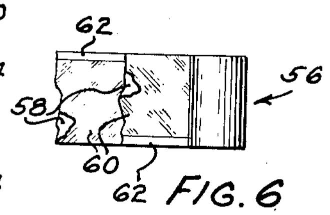
Fig. 6 is a view of one of the condenser sections with a portion of the pair of composite ribbons thereof unwound.

In the embodiment of the invention illustrated in Figs. 16 and 17, a relatively wide band 115 of metallic overlay of predetermined width is applied to one side of a sheet of dielectric 116 to form a composite sheet 117 having bare marginal stripes 118—118 along opposite edges thereof, one of which stripes 118 may be wider than the other. The metallic band 115 may be disposed along one marginal edge of the sheet of dielectric, but preferably is positioned along the central portion of the sheet. One composite sheet 117 is superposed on another, as illustrated in Fig. 16, with the major portion of the bands of metal 115 in overlapping relation and with a marginal portion of each band extending beyond one edge of the other band and disposed in overlapping relation with a portion of the bare stripe 118 of the other composite sheet. The pair of superposed composite sheets 117 are then wound into a roll 120 and cut along planes indicated by the broken lines 122—122, which pass through a bare stripe 118 of one composite sheet and through the bands 115 of metal on the other composite sheet to form a condenser section 124 (Fig. 17) having the same general construction as that of the condenser sections 50 and 90 (Figs. 6 and 12). The condenser section 124 may then have terminals applied to each end thereof and be impregnated with wax in a manner already described in connection with the other embodiments.

Each of the condensers made by practicing the above-described methods comprises a pair of bands of metallic overlay separated and insulated from each other by ribbons of dielectric on which the bands of metal overlay are adhered, one margin of each of the bands extending beyond the margin of the other band and having edge portions disposed in the plane of the end of the condenser where portions of the edge of each of the convolutions thereof are bonded and electrically connected to terminals formed at each end of the condenser by spraying molten metal thereon. The opposite marginal edge of each band of metal overlay is spaced from the opposite end of the condenser and from the terminal associated therewith.

While in the embodiments disclosed herein only one pair of composite sheets having predetermined cooperating patterns of metal overlays thereon have been used for making condensers, it will be understood that two or more pairs of composite sheets may be disposed in superposed relation and wound into rolls from which condensers may be made according to the present invention. Also, when the condensers have to withstand high voltages, one or more extra sheets of dielectric may be interposed between alternate metallized sheets to increase the dielectric strength of the condenser.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A method of making condensers which comprises applying to one side of each of a pair of sheets of dielectric a plurality of metallic bands of uniform width etxending parallel to each other longitudinally of the sheets and separated from each other by bare stripes of uniform width less than the width of said bands to form composite sheets, superposing one of said composite sheets on the other with the bands on one composite sheet disposed parallel to and displaced laterally with respect to the bands on the other composite sheet to position the bands on one sheet in overlapping relation to bare stripes and marginal portions of two adjacent bands on the other composite sheet, winding said superposed composite sheets into a roll, cutting said sheets during the winding thereof along planes passing through the overlapping portions of the bands on said composite sheets and on opposite sides of a bare stripe in each of said sheets to form condensers with each condenser having a pair of ribbons of dielectric on one side of each of which is adhered a pair of spaced apart longitudinally extending metallic bands with an edge of each band exposed in the ends of said condenser and with one of the bands on each ribbon being more than half as wide as the ribbon of dielectric, and applying terminals to the ends of said condensers.

2. A method of making wound condensers which comprises applying to one side of each of a pair of sheets of dielectric a plurality of metallic bands extending parallel to each other longitudinally of the sheet and spaced from each other by bare stripes of dielectric to form composite sheets, superposing one of the composite sheets on the other with the metallic bands on each composite sheet disposed parallel to and in overlapping relation to a bare stripe and portions of two adjacent metallic bands on the other composite sheet, winding said superposed composite sheets into a roll, and cutting said roll along parallel planes passing through the overlapping portions of the metallic bands on said composite sheets and on opposite sides of the bare stripes in each of said sheets to form condensers.

References Cited in the file of this patent

UNITED STATES PATENTS

| | | |
|---|---|---|
| 1,744,616 | Cunningham | Jan. 21, 1930 |
| 2,274,011 | Strab | Feb. 24, 1942 |
| 2,399,798 | Grouse et al. | May 7, 1946 |

FOREIGN PATENTS

| | | |
|---|---|---|
| 123,179 | Australia | May 13, 1944 |
| 903,040 | France | Sept. 21, 1945 |